Figure 1:
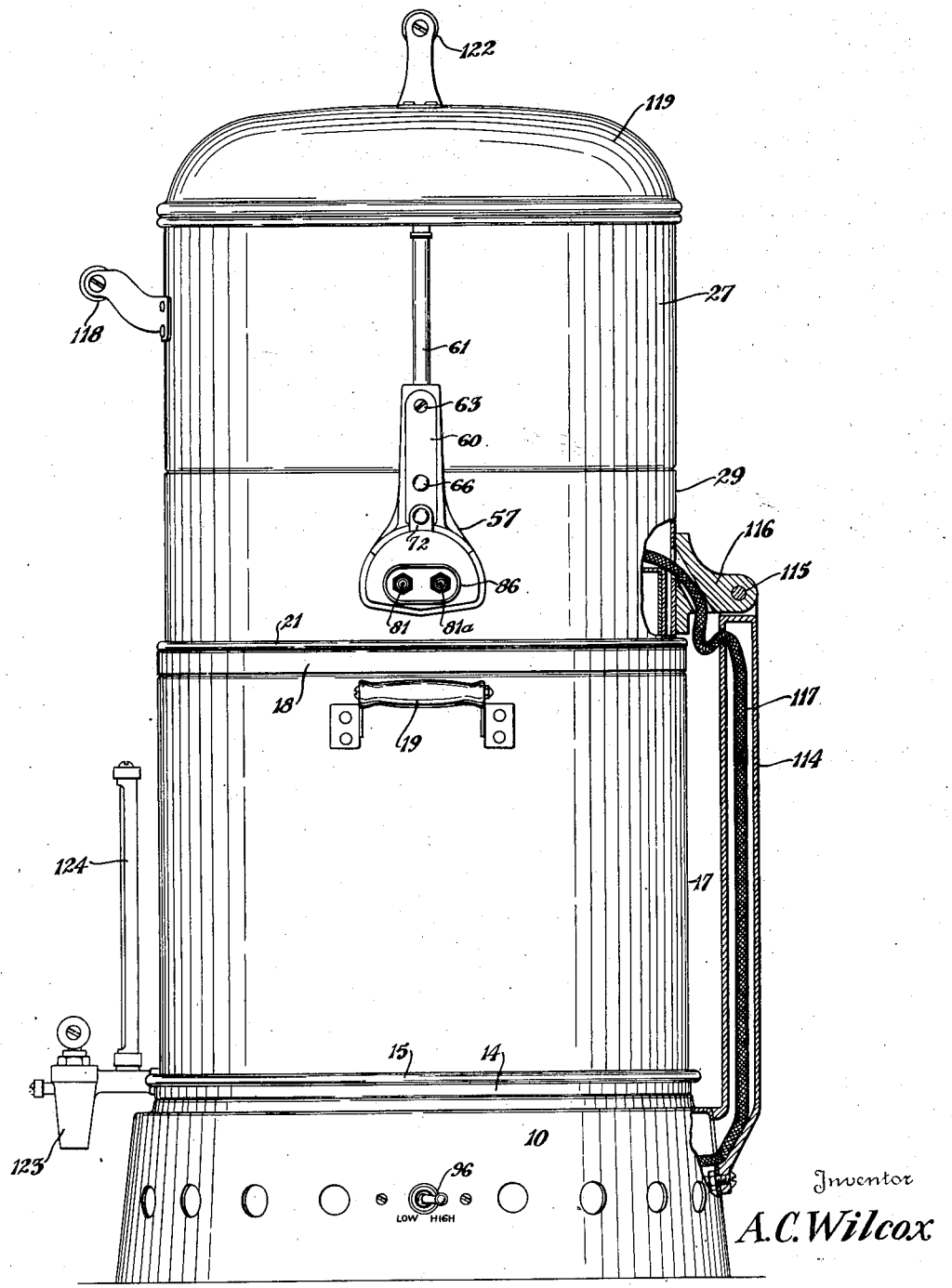

June 25, 1935.   A. C. WILCOX   2,005,764
AUTOMATIC ELECTRIC DRIP COFFEE URN
Filed April 10, 1934   3 Sheets-Sheet 1

Inventor
A. C. Wilcox

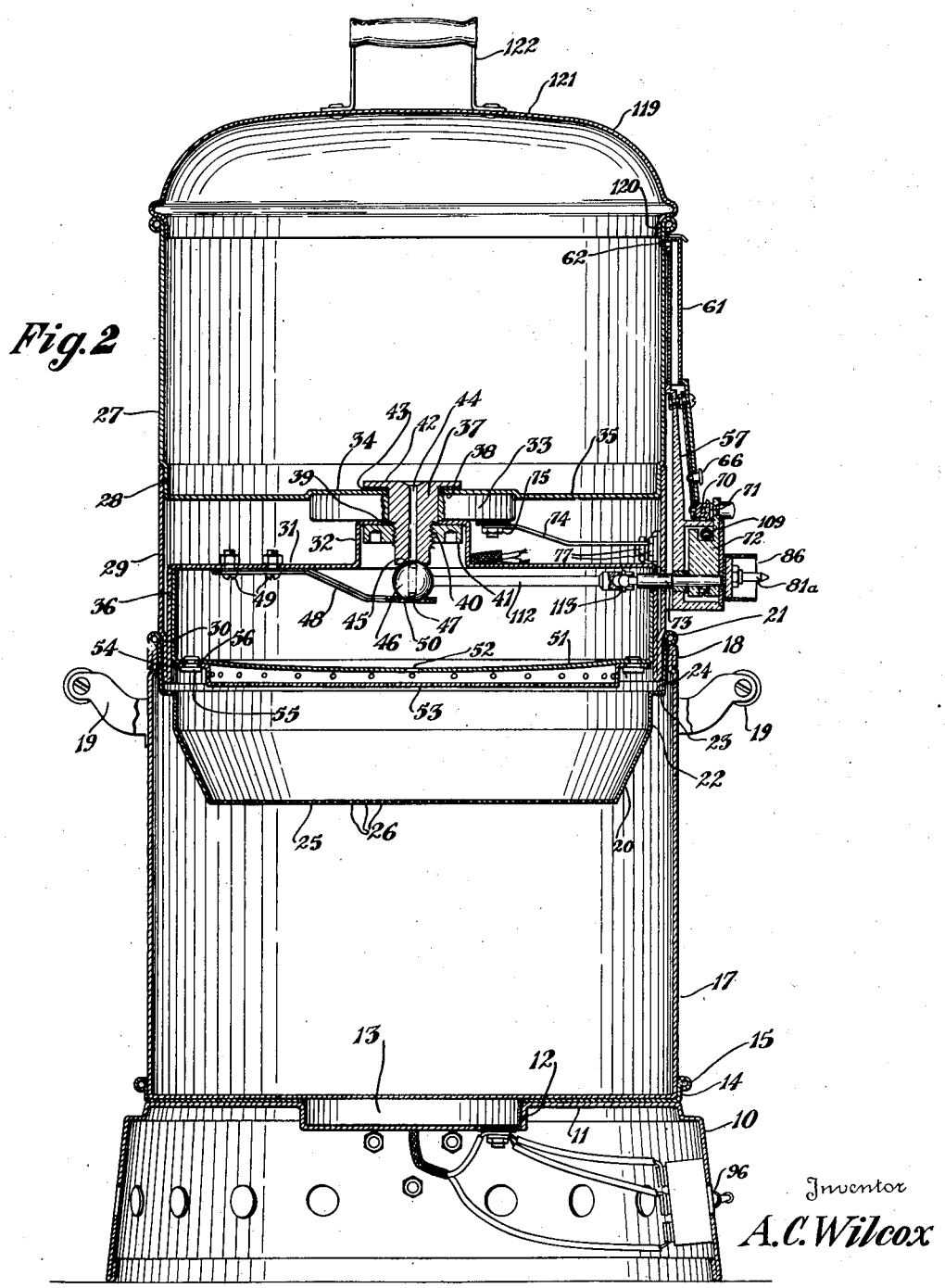

June 25, 1935.　　　A. C. WILCOX　　　2,005,764
AUTOMATIC ELECTRIC DRIP COFFEE URN
Filed April 10, 1934　　　3 Sheets-Sheet 3
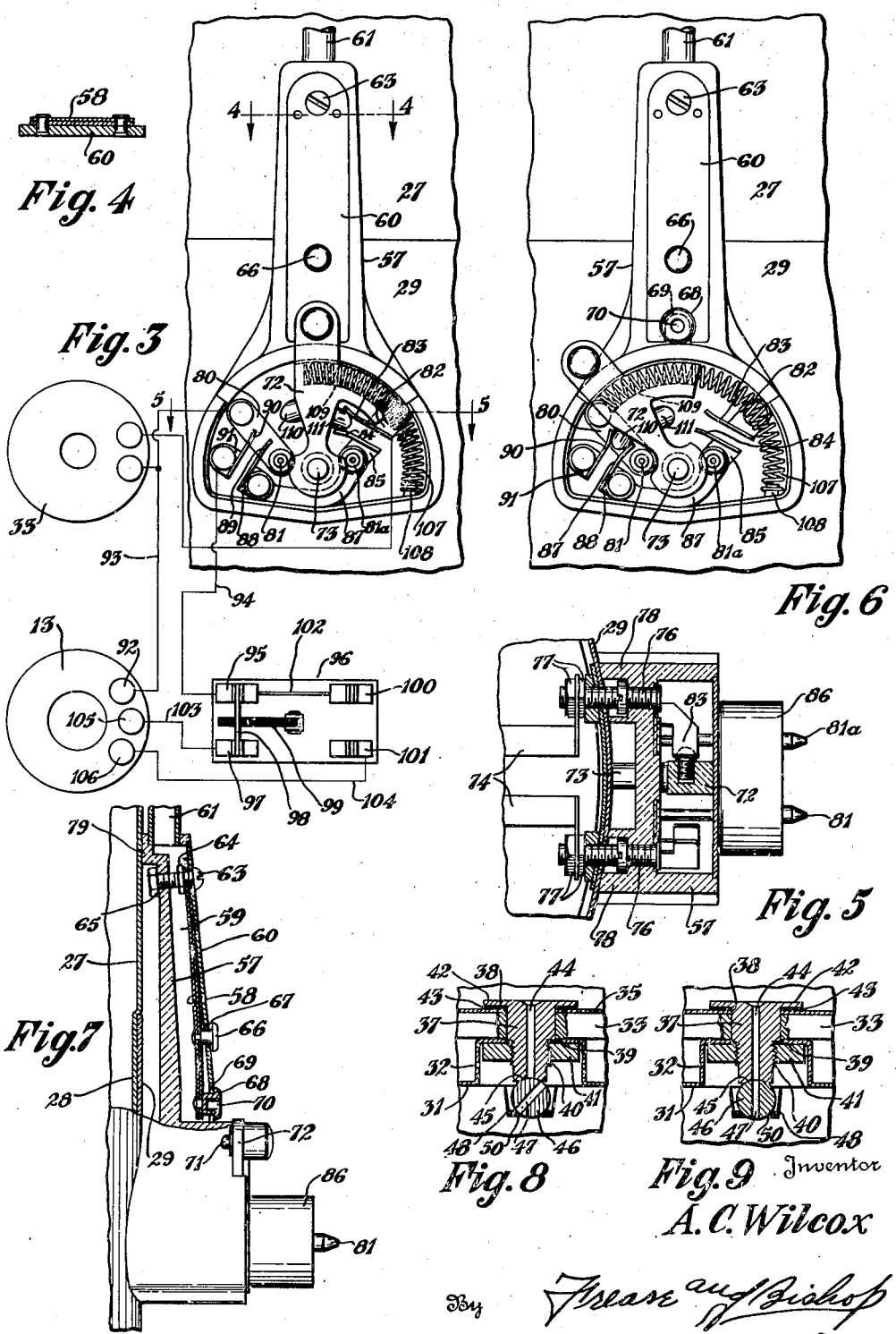
Inventor
A. C. Wilcox Patented June 25, 1935

2,005,764

UNITED STATES PATENT OFFICE 2,005,764

AUTOMATIC ELECTRIC DRIP COFFEE URN

Albert C. Wilcox, Massillon, Ohio, assignor to The Enterprise Aluminum Company, Massillon, Ohio, a corporation of Ohio Application April 10, 1934, Serial No. 719,912

9 Claims. (Cl. 219—43)

The invention relates to automatically operating, electrically heated drip coffee urns such as are used in restaurants, cafes and other places where large amounts of coffee are made.

The object of the improvement is to provide a drip coffee urn including a water container and a ground coffee basket located beneath the same, electric means being provided for heating the water in the water container and means being provided for discharging the water from the water container through the coffee basket when the water in the container reaches a predetermined temperature; a container for the liquid coffee beverage being provided beneath the ground coffee basket, a second heating means being provided beneath said liquid coffee container, thermostatic means being provided for automatically cutting out the first named heating means and operating the second named heating means when the heated water is discharged from the water container through the ground coffee basket.

Another object of the improvement is to provide a valve in the water container operatively connected to a thermally controlled switch in the circuits to both of the heating elements whereby when steam from the water container contacts with the thermally controlled switch, the current will be cut off from the upper heating element, the valve will be opened to discharge the hot water from the water container through the coffee basket and the circuit will be closed to the lower heating element so as to maintain the liquid coffee beverage at the desired temperature.

A further object is to provide a manually operated toggle switch in the circuit to the lower heating element whereby either high heat or low heat may be produced when the lower heating element is automatically turned on.

Another object of the improvement is to provide a hinge connection for the water container so that the same may be swung upwardly and outwardly in order to permit access to the ground coffee basket without necessitating lifting the water container from the coffee basket.

The above objects, together with others which will be apparent from an inspection of the drawings and the following description, or which may be later pointed out, may be attained by constructing the improved automatic electric drip coffee urn in the manner illustrated in the accompanying drawings, in which Figure 1 is a side elevation of a preferred form of the improved electric drip coffee urn, parts being broken away for the purpose of illustration;

Fig. 2, a vertical sectional view through the improved drip coffee urn, taken substantially at right angles to the position shown in Fig. 1;

Fig. 3, an enlarged detail elevation of the thermally controlled switch for operating the valve and the heating elements which, together with the circuits thereto, are shown diagrammatically;

Fig. 4, a detail transverse sectional view through the upper portion of the switch cover plate and bimetal strip on a slightly enlarged scale, taken as on the line 4—4, Fig. 3;

Fig. 5, a detail sectional view through the switch, taken as on the line 5—5, Fig. 3;

Fig. 6, an elevation of the switch similar to Fig. 3, showing the switch in the opposite position to that shown in Fig. 3;

Fig. 7, a sectional side elevation of the switch in the position shown in Fig. 6;

Fig. 8, a detail sectional view of the automatically operated valve, showing the same in closed position; and Fig. 9, a similar view showing the valve in open position.

Similar numerals refer to similar parts throughout the drawings.

The improved drip coffee urn is preferably formed of aluminum or other sheet metal and is supported upon a base 10 preferably in the form of a truncated cone, the top wall 11 thereof being preferably centrally recessed as at 12 to accommodate the electric heating element 13 provided for the purpose of heating the liquid coffee beverage.

An upturned annular flange 14 may be provided upon the base 10 preferably terminating in the peripheral bead 15 and forming a socket to receive the liquid coffee beverage container indicated at 17. This container may be substantially cylindric in form and the upper open edge portion thereof is preferably folded back upon itself as indicated at 18. Handles 19 of any suitable design may be provided upon opposite sides of the container 17 for the purpose of bodily lifting and moving the urn.

The ground coffee basket is indicated generally at 20 and may be provided with the peripheral bead 21 at its upper open edge adapted to rest upon the upper edge portion 18 of the liquid coffee container. This coffee basket preferably has its lower portion offset as at 22, providing a shoulder 23 which may be provided with perforations as indicated at 24, and the bottom wall 25 of the coffee basket is provided with a plurality of small perforations as indicated at 26.

The water container is indicated generally by the numeral 27 and the lower end thereof may preferably be slightly reduced as at 28 to receive the cylindric extension 29 which is fixed to said reduced portion and which is itself preferably slightly reduced at its lower end as at 30 to be received within the upper open end of the coffee basket. This cylindric extension 29 forms the outer or peripheral wall of a lower shell providing a compartment or chamber to house the heating element for heating the water in the container. This shell is indicated generally at 31 and is provided with the central raised portion 32 upon which the heating element 33 is seated, the upper side of said heating element being received in a slight depression 34 formed in the bottom wall 35 of the water container 27. The depending annular flange 36 of the shell 31 is preferably formed integral with the reduced portion 30 of the cylindric extension 29 thereof.

A stud 37 may be provided for connecting the lower shell 31 to the water container 27 and for this purpose may be located through a central opening 38 in the bottom wall of the water container and through a similar opening 39 in the central raised portion 32 of the lower shell, the stud being reduced and threaded below said point as indicated at 40 to receive the nut 41. A head 42 is formed upon the upper end of the stud 37 between which and the bottom wall of the water container may be located a gasket 43, the nut 41 contacting with the raised central portion of the lower shell for drawing the head of the stud tightly against the bottom wall of the water container and clamping the electric heating element 33 between the bottom of the water container and the raised central portion 32 of the lower shell.

The stud 37 is provided with the central passage 44 forming a discharge outlet for the water container, and the lower end of the stud is concaved forming a substantially half-round valve seat 45 within which the ball valve 46 is seated. A discharge port 47 is formed through the ball 46 and arranged to register with the discharge outlet 44 of the stud 37 when the ball is rotated upon its seat to the open position as shown in Fig. 9.

A spring strip 48, preferably formed of bimetal as shown, is connected at one end to the lower shell 31 as by the bolts 49 and the free end portion may be provided with an aperture 50 of considerably less diameter than the ball 46 arranged to receive the lower side of the ball, as shown in the drawings, for the purpose of pressing the ball tightly against the seat 45 at all times.

The valve mechanism may be enclosed within the lower shell 31 as by the closure member 51 which may be in the form of a perforated spreader plate or if desired, may be as shown in Fig. 2, being preferably curved or tapered downward toward its center at which point it is provided with an aperture 52 of suitable size to permit rapid discharge therethrough of all the water passing through the valve.

In this form the spreader plate 53 may be a perforated disk having the upwardly offset peripheral flange 54 and is so constructed that it may, if desired, be placed loosely upon the top of the coffee basket, or, as shown in Fig. 2, may be detachably engaged with the headed studs 55 carried by the closure member 51. For this purpose the apertures 56 in the flange 54, which engage the studs 55, may be in the form of keyhole slots to permit the spreader plate to be quickly and easily attached to or detached from the closure member.

A thermally operated switch is provided for the purpose of cutting off the current to the upper heating element 33 when the water in the container 27 reaches the boiling point, and at the same time opening the valve to permit the boiling water to be discharged from the water container through the coffee basket, and for simultaneously turning on the current to the lower heating element 13.

This switch may be located in an insulation housing indicated generally at 57 mounted upon one side of the water container and is preferably spaced therefrom as illustrated in the drawings in order to permit free circulation of air entirely around the switch housing so that the thermal element therein will not be operated by heat radiated or conducted from the adjacent wall of the water container.

The thermal element is shown as in the form of a bimetal strip 58 located within the chamber 59 formed in the switch housing and closed by the plate 60 which may be of metal. This chamber 59 of the switch housing communicates with the interior of the water container as by the tube 61 which leads from the upper end of the chamber 59 to a bleeder port 62 in the upper portion of the water container.

The upper end only of the bimetal strip 58 may be connected to the switch housing as by the bolt 63 which also connects the cover plate 62 to the switch housing, a nut 64 clamping the upper end portion of the bimetal strip to the upper portion of the cover plate and a nut 65 upon the end of the bolt fastening the cover plate and bimetal strip to the insulation housing.

For the purpose of manually operating the bimetal strip, in the event that the same may be necessary or desirable, a headed stud 66 may be fixed to an intermediate portion of the bimetal strip and located through an aperture 67 in the cover plate, which is of sufficient size to permit the stud to move freely therethrough. A stud 68 is fixed to the lower end of the bimetal strip and located through an aperture 69 in the cover plate, of sufficient size to permit the stud to move freely therethrough. This stud is provided in its outer end with a socket 70 adapted to receive the rounded stud 71 upon the upper end of the insulation switch arm 72, the lower end of which is fixed to the shaft 73 which is journaled in the insulation housing 57.

The upper heating element 33 is connected to the switch by means of the bus bars 74 which may be connected at one end to the heating element as by the bolts 75 and at their other ends to the bolts 76 as by the nuts 77. The insulation housing 57 is connected to the cylindric extension 29 of the lower shell by means of the bolts 76 and nuts 77 and is spaced therefrom as by the hollow bosses 78 through which these bolts extend and by the boss or projection 79 at the upper end of the housing, in order that there may be a complete circulation of air entirely around the switch housing so as to prevent the bimetal strip from being operated by heat radiated or conducted from the water container.

One of the bolts 76 is connected at its outer end to the upper end of a bus bar 80, to the other end of which is connected a contact post 81 adapted to be received in the usual connector plug. The other bolt 76 is connected to a contact member 82 having the annular contact flange or jaw 83 which is spaced from a similar flange or jaw 84 upon the contact member 85 connected to the contact post 81a spaced from the post 81 and adapted to be similarly received in the connecter plug. A suitable guard or shield 86 may surround the contact posts 81 and 81a to receive the usual connecter plug as in ordinary practice.

A bus bar 87 connects the contact member 85 with a contact member 88 having an angular flange or jaw 89 thereon which is spaced from a similar flange or jaw 90 upon the contact member 91. As shown diagrammatically in Fig. 3, one terminal or binding post 92 of the lower heating element 13 is connected as by the wire 93 with the bus bar 80 of the switch. A wire 94 leads from the contact member 91 to one pair of contact jaws 95 of the double pole toggle switch indicated generally at 96 and adapted to be manually operated to control the lower heating element 13 to produce either high or low heat as may be desired, when the lower heating element is automatically turned on as will be later described in detail.

This toggle switch may be of any usual and ordinary type of toggle switch and includes the switch jaws 97 located adjacent to the jaws 95 and adapted to be simultaneously engaged by the switch blade 98 carried upon the lever 99. At the other end of the toggle switch is located the spaced pairs of switch jaws 100 and 101 arranged to be simultaneously engaged by the switch blade 98 when the lever is thrown to the opposite position. The switch jaws 95 and 100 are connected by a suitable conductor 102 and wires 103 and 104 lead from the switch jaws 97 to the terminal 105 and from the switch jaws 101 to the terminal 106 respectively, upon the lower heating element.

The switch arm 72 is arranged to be normally urged toward the position shown in Fig. 6 by means of the coil spring 107, one end of which may be connected to a stud 108 in one side of the insulation switch housing and the other end being located in a recess 109 in the switch arm. In this position the contact stud 110 upon the switch arm is engaged between the angular flanges or jaws 89 and 90 while the contact stud 111 is disengaged from the angular flanges or jaws 83 and 84, the circuit to the lower heating element 13 thus being closed while the circuit to the upper heating element 33 is open. The valve 46, in this position of the switch arm, is turned to the open position as shown in Fig. 9, with the opening 47 therethrough registering with the discharge outlet 44 in the stud 37.

A stem 112 is fixed to the ball valve 46 and is connected to the shaft 73 of the switch arm as by the universal joint or ball and socket joint 113 whereby the valve is arranged to be operated by the switch arm. With the switch arm in the position shown in Fig. 3, the ball valve is in closed position as shown in Fig. 8 and with the switch arm in the position shown in Fig. 6 the ball valve is in open position as shown in Fig. 9.

For the purpose of easily obtaining access to the coffee basket, the water container and lower shell as a unit may be hingedly supported above the coffee basket so that instead of requiring the water container and lower shell to be bodily lifted from the coffee basket to obtain access thereto, it is only necessary to swing the water container and lower shell outward upon its hinge.

For this purpose a standard 114 may be carried by the base 10 and extend upward to a point above the top of the coffee basket where it is hingedly connected as at 115 to a lug 116 fixed upon the side of the cylindric extension 29 of the lower shell. This standard is preferably hollow in order that it may enclose a cable 117 containing the wires leading from the switch to the lower heating element.

The handle 118 may be provided upon the water container at a point opposite to the hinge in order that the same may be swung backward upon its hinge. A suitable cover 119 may be provided with a depending flange 120 to fit into the upper open end of the water container, a suitable aperture 121 being formed in the cover to prevent the formation of a vacuum within the water container and a handle 122 being provided for removing or replacing the cover.

A faucet 123 is provided in the lower portion of the liquid coffee beverage container or receptacle 17 for withdrawing the contents therefrom as desired and a water gauge 124 may be provided to indicate the liquid level therein.

In operating the improved drip coffee urn, the water container and shell are swung backward upon the hinge joint 115 so that access may be had to the coffee basket. The desired amount of ground coffee is placed in the basket and the water container and shell are moved back to the normal position. The switch handle 72 is then manually moved to the position shown in Fig. 3, the lug 71 thereon engaging the socket 70 in the stud 68. The valve 46 is thus moved to the closed position and held in this position.

The cover 119 is then removed from the water container and the desired amount of cold water is placed therein, after which the cover is replaced and a connecter plug of usual and ordinary construction provided with a cord attached to any suitable electric current outlet, is connected to the contact posts 81 and 81a. Current is thus furnished to the upper heating element 33 which heats the water in the water container 27.

When the water reaches the boiling temperature, steam will be discharged from the water container through the bleeder port 62 and tube 61 into the chamber 59 of the switch housing, the steam contacting with the bimetal strip 58 and causing the same to warp or bend inward, withdrawing the hollow stud 68 from engagement with the rounded stud 71 upon the switch arm 72, permitting the spring 107 to throw the switch arm to the position shown in Fig. 6, disengaging the contact stud 111 from the jaws 83 and 84, thus breaking the circuit to the upper heating element 33 and engaging the contact stud 110 with the jaws 89 and 90, closing the circuit to the lower heating element 13.

At the same time, the rotation of the switch arm rotates the shaft 73 and through it the stem 112 of the ball valve 46, turning said ball valve to the open position, as shown in Fig. 9, permitting the hot water from the water container to be discharged through the opening 47 in the ball and through the opening 52 in the closure member 51, the water being distributed over the perforated spreader plate 53 and passing therefrom through the ground coffee in the coffee basket, the liquid coffee beverage dripping through the perforated bottom of the coffee basket into the lower receptacle 17 where it will be maintained at the desired temperature by the lower heating element 13. By manually operating the toggle switch 96, the lower heating element may be operated either at high or low temperature as may be desired.

I claim:

1. An automatic electric drip coffee urn including a water container, a coffee basket beneath said water container, a coffee beverage receptacle beneath the coffee basket, means for heating water in the water container, means for heating beverage in the beverage receptacle, means operated by the boiling of the water in the water container for automatically cutting out said first named heating means and simultaneously turning on said second named heating means, and means operated by the boiling of the water for discharging the water from the water container through the coffee basket and into the beverage receptacle.

2. An automatic electric drip coffee urn including a water container, a coffee basket beneath said water container, a coffee beverage receptacle beneath the coffee basket, means for heating water in the water container, means for heating beverage in the beverage receptacle, means operated by steam produced by the boiling of the water in the water container for automatically cutting out said first named heating means and simultaneously turning on said second named heating means, and means operated by the boiling of the water for discharging the water from the water container through the coffee basket and into the beverage receptacle.

3. An automatic electric drip coffee urn including a water container, a coffee basket beneath said water container, a coffee beverage receptacle beneath the coffee basket, means for heating water in the water container, means for heating beverage in the beverage receptacle, means operated by the boiling of the water in the water container for automatically cutting out said first named heating means and simultaneously turning on said second named heating means, and a valve operated by the boiling of the water for discharging the water from the water container through the coffee basket and into the beverage receptacle.

4. An automatic electric drip coffee urn including a water container, a coffee basket beneath said water container, a coffee beverage receptacle beneath the coffee basket, an electric heating element for heating water in the water container, an electric heating element for heating coffee beverage in the beverage receptacle, a thermally operated switch operated by boiling of the water in the water container for cutting out said first named heating element and turning on said second named heating element when the water reaches the boiling temperature, and a valve operated by the thermally operated switch for discharging the water from the water container through the coffee basket and into the beverage receptacle.

5. An automatic electric drip coffee urn including a water container, a coffee basket beneath the water container, a valve associated with the water container, a coffee beverage receptacle beneath the coffee basket, a heating element for said beverage receptacle and means for simultaneously opening said valve and turning on said heating element.

6. An automatic electric drip coffee urn including a water container, a coffee basket beneath said water container, heating means for the water container, a valve associated with the water container, a coffee beverage receptacle beneath the coffee basket, heating means for the beverage receptacle, and thermally controlled means for cutting out said first named heating means and turning on said second named heating means and opening said valve to discharge water from the water container through the coffee basket and into the beverage receptacle when the water reaches a predetermined temperature.

7. An automatic electric drip coffee urn including a water container, a coffee basket beneath said water container, a coffee beverage receptacle beneath the coffee basket, an electric heating element for heating water in the water container, an electric heating element for heating coffee beverage in the beverage receptacle, a thermally operated switch operated by boiling of the water in the water container for cutting out said first named heating element and turning on said second named heating element when the water reaches the boiling temperature, a valve operated by the thermally operated switch for discharging the water from the water container through the coffee basket and into the beverage receptacle, and a manually operated switch for operating the second named heating element at different temperatures.

8. A drip coffee urn including a coffee beverage receptacle, a ground coffee basket supported in the upper open end of the beverage receptacle, and a water container hingedly mounted above the coffee basket and arranged to normally rest upon the upper open end of the coffee basket.

9. A drip coffee urn including a base, a coffee beverage receptacle supported upon the base, a ground coffee basket supported in the upper open end of the beverage receptacle, an upright carried by the base and located at one side of the beverage receptacle, and a water container hingedly connected to said upright and arranged to normally rest upon the upper open end of the coffee basket.

ALBERT C. WILCOX.